US005271286A

United States Patent [19]

Vranish

[11] Patent Number: 5,271,286

[45] Date of Patent: Dec. 21, 1993

[54] SPLINE SCREW MULTIPLE ROTATIONS MECHANISM

[75] Inventor: John M. Vranish, Crofton, Md.

[73] Assignee: The United States of America as represented by the Administrator, National Aeronautics & Space Administration, Washington, D.C.

[21] Appl. No.: 946,111

[22] Filed: Sep. 17, 1992

[51] Int. Cl.[5] .......................... F16H 25/20; F16D 1/00; H01R 13/627

[52] U.S. Cl. .................................. 74/89.15; 244/161; 403/13; 403/24; 439/362

[58] Field of Search ........................ 74/89.15; 244/161; 403/13, 24; 439/362

[56] References Cited

U.S. PATENT DOCUMENTS

| | | | |
|---|---|---|---|
| 4,138,148 | 2/1979 | Zaremba | 285/317 |
| 4,227,853 | 10/1980 | Woodford et al. | 414/738 |
| 4,431,333 | 2/1984 | Chandler | 244/161 X |
| 4,453,449 | 6/1984 | Hollomann | 89/1.806 |
| 4,607,815 | 8/1986 | Turci et al. | 244/161 |
| 4,709,454 | 12/1987 | Barnes | 24/590 |
| 4,828,035 | 5/1989 | McInturff | 166/339 |
| 4,833,760 | 5/1989 | Sundström | 24/609 |
| 4,957,387 | 9/1990 | Nasu | 403/322 |
| 4,997,305 | 3/1991 | Yang | 74/89.15 X |
| 5,013,178 | 5/1991 | Baker et al. | 403/330 |
| 5,046,691 | 9/1991 | Hart | 244/161 X |
| 5,169,334 | 12/1992 | Makita | 439/362 |
| 5,174,772 | 12/1992 | Vranish | 439/131 |

FOREIGN PATENT DOCUMENTS

| | | | |
|---|---|---|---|
| 1-314699 | 12/1989 | Japan | 244/161 |

*Primary Examiner*—Allan D. Herrmann
*Attorney, Agent, or Firm*—Paul S. Clohan, Jr.; R. Dennis Marchant; Guy M. Miller

[57] ABSTRACT

A system for coupling two bodies together and for transmitting torque from one body to another with mechanical timing and sequencing so that (1) the bodies are handled in a safe manner and nothing floats loose in space, (2) electrical connectors are engaged as long as possible so that the internal processes can be monitored throughout by sensors and (3) electrical and mechanical power and signals are coupled. The first body has a splined driver for providing the input torque and the second body has a threaded drive member capable of rotation and also of limited translation embedded within that will mate with and fasten to the splined driver. The second body also has a bevel gear member capable of rotation and also of limited translation embedded within and this bevel gear member is coaxial with the threaded drive member. A compression spring provides a preload on the rotating threaded member, and a thrust bearing is used for limiting the translation of the bevel gear member such that when the bevel gear member reaches the upward limit of its translation the two bodies are fully coupled and the bevel gear member then rotates due to the input torque transmitted from the splined driver through the threaded drive member to the bevel gear member. An output bevel gear with an attached output drive shaft is embedded in the second body and meshes with the threaded rotating bevel gear member to transmit the input torque to the output drive shaft.

6 Claims, 3 Drawing Sheets

SPLINE SCREW MULTIPLE ROTATIONS MECHANISM

ORIGIN OF THE INVENTION

The invention described herein was made by an employee of the United States Government, and may be manufactured and used by or for the Government for governmental purposes without the payment of any royalties thereon or therefor.

CROSS REFERENCE TO RELATED APPLICATIONS

This invention is related to an invention shown and described in U.S. Ser. No. 07/824,126 (GSC 13,430-1), entitled "Work Attachment Mechanism/Work Attachment Fixture" (WAM/WAF), filed in name of John M. Vranish, the present inventor, on Jan. 22, 1992, now U.S. Pat. No. 5,174,772, and to U.S. Ser. No. 07/947,612 (GSC 13,454-1), entitled "Spline Screw Payload Fastening System", filed in the name of John M. Vranish, the present inventor, on Sep. 21, 1992. The above are assigned to the assignee of the present invention. Moreover, the teachings of these related applications is herein meant to be incorporated by reference.

TECHNICAL FIELD

This invention, the Spline Screw Multiple Rotations Mechanism (SSMRM) relates generally to attachment means for joining two bodies together and more particularly to a means for permitting a robot to berth and attach itself to a workpiece in outer space so that it can properly execute its assigned tasks.

BACKGROUND ART

There are no mechanisms that relate directly with this invention. From a robot point-of-view, a gripper with nut runner on the end of a robot in combination with an electrical connector is a system that performs the same functions as the invention. In other instances an astronaut can replace the robot. However, a gripper (or fastener) and a nut runner is still required. And this system must be augmented by an electrical connector. There are other, special fastening systems with embedded motors, drive trains and fastening mechanicals (such as the Payload Interface Adapter proposed for U.S. Space Station). These often have separate systems for making electrical connections.

DISADVANTAGES OF PRIOR ART

Possible prior art examples must of necessity have a motor, controls, sensors, mechanicals and interfaces to the rest of the main platform (e.g. the U.S. Space Station). Most, if not all, of these components are embedded in the specific payload. This means that, for many of the components (e.g. motor), a separate item is required for each payload. And, even so, they do not have the preload force-to-input torque ratio of a spline screw-based systems.

ADVANTAGES OF INVENTION OVER PRIOR ART

1) Exceptional holding forces and torques. This is true for rattle free preloaded forces and torques and for ultimate forces and torques in attaching a special payload to the robot's Standard End Effector (SEE) (and to the Space Station Structure). This is also true for the output torque delivered by the output shaft of the special payload interface mechanism because it essentially transmits the torque from the robot wrist motor, which is outstanding, and can gear up that torque if necessary.

2) Outstanding capabilities in passing electrical power and signals.

3) Built in protection for the electrical and signal connectors.

4) Simplicity, reliability and minimum number of parts. Some entire subsystems can be eliminated. For example, embedded motors, controllers, electronic hardware and software interfaces, separate electrical connector actuation systems and their dust cover actuation systems can all be eliminated.

5) Outstanding hand-off control. This will help, both in an EVA and robot sense. For a robot this means safe payload handling with no tethers required. For EVA operations, this means only one short tether; the hand tool tethered to the Astronaut.

6) Low required actuation torque. This, in turn, means less power and smaller, more dexterous tools (End Effectors in the case of the robot and EVA hand tool in the case of the Astronaut.)

7) Compact size/low mass.

8) Precision rattle free mating between the parts, robot to special payload and special payload to space station structure.

9) Enhanced mission capabilities. The robot (or astronaut) would now be able to communicate with, and get power to, the special payload. Thus, sensors can be added to the payload for safe precision docking. Other sensors inside the payload could report the health of the instruments inside or the integrity of the connection etc. The robot or Astronaut could even communicate through the payload to Space Station.

10) Elimination of the protruding 'H' plate handle interfaces currently required on each object to be grasped.

11) Simplified controls. This technique is essentially a direct "peg-in-the-hole". Acquiring an object with a gripper in zero "g" is less direct and hence more difficult with respect to controls. This would be even more apparent during teleoperation.

STATEMENT OF THE INVENTION

It is therefore an object of the present invention to permit a robot to reliably and safely fasten special payloads which require multiple fastening rotations to a fixture in a Zero 'G' as well as a one 'G' environment such that these stored items remain secure through a shuttle launch and landing.

A secondary object of the system is that it be able to supply power and signals to the payload through both the robot and through the fixture interfaces.

A further object is that the system be compatible with other NASA concepts so that a consistent Comprehensive Fastening Strategy (CFS) can be pursued.

These and other objects are achieved by providing the capability of using a simple, rotating, passive (no embedded electric motors/actuators) spline screw SEE type mechanism to achieve multiple rotations and still maintain the correct timing and hand-off procedures (soft dock, hard dock, preload) in proper order and local force/torque reaction, thus retaining safe control of the special payload at all times. Two devices are described; one which interfaces electrical connectors and one which does not.

The Mechanical Details of each of the two mechanisms is unique. For the SSMRM without Electrical Connectors these include:

a) The Torque Gear (6, FIG. 1) and how it interfaces to the Output Drive Shaft (12, FIG. 1), the Bolt (4, FIG. 1) and the gear interfaces of the Torque Gear to the Space Station Structure (9 and 10 FIG. 1). These components permit the multiple rotations, the torque generation and the safe timing and control of the system throughout, yet are extremely simple, strong and reliable.

b) The Embedded Preload Spring System (8, FIG. 1). This permits the spline screw system to perform its normal functions of hard dock, soft dock, ejection, preload etc., but with a more compact, simpler package. Previously, the Preload Spring was around the circumference of the large part of the Bolt (4, FIG. 1). This required the Bolt to have a spring retaining ridge added to it. Further, it also made attractive the addition of a rolling member reaction bearing because of the increased moment arm of the larger diameter spring. With the new system, a simple teflon washer will suffice.

For the SSMRM with Electrical Connectors these include:

a) The Torque Drive Gear (14, FIG. 2) w/reaction bearing coupling to the space station structure, output gear teeth and input traction drive (using a force-multiplying small angle of incidence). This provides a simple means of permitting torque to be coupled to the output shaft (12, FIG. 2) once the electrical connectors are positioned.

b) The Drive Nut (18, FIG. 2). This component provides a simple, reliable means of ensuring several key aspects of the timing. It ensures that during the process in which the robot SEE is acquiring the special payload, soft dock and hard dock are achieved first followed by electrical connector insertion before torque is generated to the Output Gear (12, FIG. 2). And, during the process in which the special payload is being handed off from the robot SEE to the space station structure, the special payload is fastened to the space station structure first; followed next by disengaging and seating the electrical connectors; then hard dock, soft dock and finally ejection. Also, the threaded portion of this nut permits torque to be transmitted from the Bolt (20, FIG. 2) through the traction drive surface of the nut to the Torque Drive Gear.

c) The Connector/Nut Interface (32, FIG. 2). This component causes the Electrical Connectors to translate up and down with the Drive Nut. However, while the Drive Nut may or may not rotate, as the case may be, because of the connector nut interface, the Electrical Connectors are able to translate only. The Friction Couple Preload Spring of the Connector/Nut Interface causes the Drive Nut to translate unless frictional forces build up between the Bolt (20, FIG. 2) and the Drive Nut such that the Nut rotates with the Bolt and torque output is produced. The Connector/Nut Interface also provides a mechanical timing delay to permit the Electrical Connectors to be engaged before torque output is produced (special payload initially attached to the space station structure) and to remain engaged until after hand-off to the space station structure is complete (special payload initially attached to the robot SEE).

d) The Embedded Preload Spring System (24, FIG. 2). This permits the spline screw system to perform its normal functions of hard dock, soft dock, ejection, preload etc. but with a more compact, simpler package. Previously, the Preload Spring was around the circumference of the large part of the Bolt (20, FIG. 2). This required the Bolt to have a spring retaining ridge added to it. Further, it also made attractive the addition of a rolling member reaction bearing because of the increased moment arm of the larger diameter spring. With the new system, a simple teflon washer will suffice.

DETAILED DESCRIPTION OF THE INVENTION

This invention disclosure will discuss two types of Spline Screw Multiple Rotations Mechanisms, one in which no electrical connectors are required and one in which they are.

NO ELECTRICAL CONNECTORS

I will first describe the case in which no electrical connectors are required beginning with the sequence where the Special Payload is initially secured to the Space Station structure and the robot grasps it, and unfastens and removes it from the Space Station structure.

Figure 1:
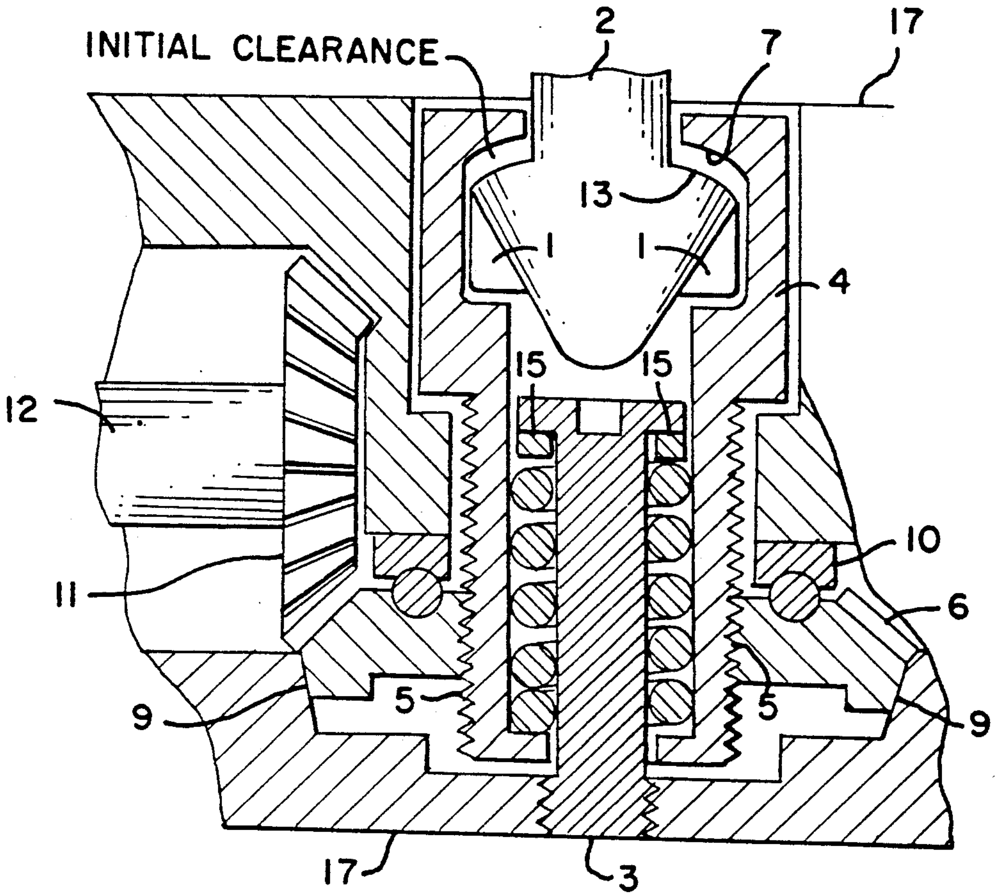
FIG. 1 is a cross-sectional view of a Spline Screw Multiple Rotations Mechanism having no electrical connectors.
Figure 1A:
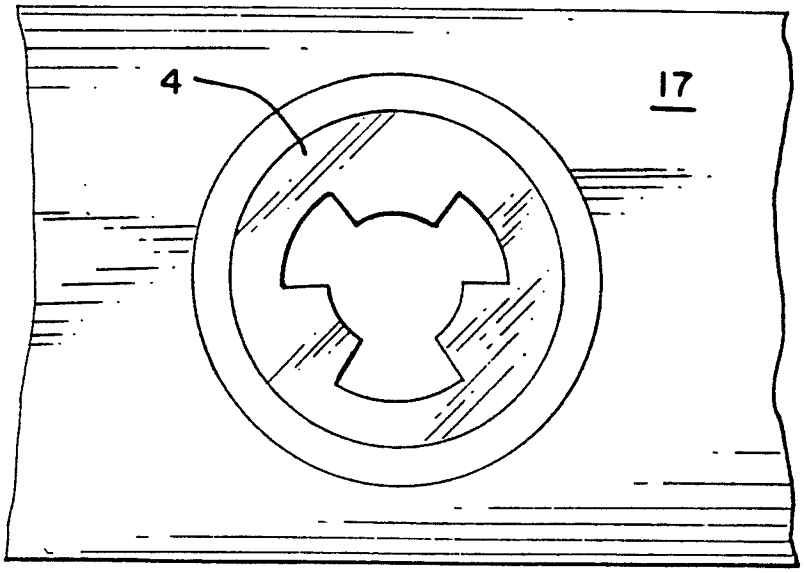
FIG. 1*a* is a top view of the Spline Screw Multiple Rotations Mechanisms with the special end effector driver removed for clarity.

Referring now to FIGS. 1 and 1*a*, Special End Effector (SEE) Driver 2, having a plurality of radially projecting spline members 1, is inserted into Spline Receptor and Bolt 4 (refer to top view 1*a* which shows the slots the radially projecting spline members 1 will interface with), turns clockwise and soft docks. At this point the payload is held by both the robot (not shown) and the space station structure 17. SEE Driver 2 builds up clockwise torque until Bolt 4, preloaded by tightening plug 3 against spring 8, breaks loose from the threaded portion 5 of Torque Gear 6 and the two members rotate together. Torque Gear 6 is positioned by Sliding Thrust Bearing 9, which can be merely a ceramic surface coating. This will require on the order of 0.5 ft-lbs. Supporting calculations are presented below under expected performance.

SEE Driver 2 continues to turn clockwise and Bolt 4 moves slightly downward taking out the initial clearance between upper surface 7 and load-bearing surface 13 of SEE Driver 2 (the initial clearance is typically $\frac{1}{8}$ in.). This process continues until the forces of Preload Spring 8, which rides on teflon washer 15, are transferred to load-bearing surface 13 of SEE Driver 2. The robot is now attached to the special payload (in hard dock) with the full force of Preload Spring 8 (typically 100 lbf).

SEE Driver 2 continues to turn clockwise. Bolt 4 is now prevented from translating downwards, but relative translation between Bolt 4 and the threaded inside portion 5 of Torque Gear 6 must occur. Thus torque gear 6 tries to progress upwards where it is opposed by Rolling Thrust Bearing 10. In the process, forces are built up on the threads of Torque Gear 6 and torque is generated to Output Gear 11 and Output Shaft 12. The system can now rotate continuously until Output Shaft 12 is stopped. Throughout these rotations, SEE Driver 2 remains in hard dock control of the special payload. The special payload also remains attached to the space station structure.

Once the rotation is stopped, Bolt 4 once again attempts to translate downwards, fastening the Special Payload to SEE Driver 2 in Preload and ejecting the Special Payload from the Space Station Structure.

I will now continue the case in which no electrical connectors are required by following the sequence where the special payload is initially secured to robot SEE Driver 2 and the robot fastens it to the space station structure.

Robot SEE Driver 2, with special payload attached, approaches the space station structure and inserts the guide mechanisms of the special payload into the corresponding alignment guides of the space station structure using traditional force feedback and "peg-in-the-hole" techniques. SEE Driver 2 rotates counterclockwise. The frictional force between the threaded inside portion 5 of Torque Gear 6 and Bolt 4 provided during preload (described above) provides a torque to Output Drive Shaft 12, opposed only by the minimal losses of Rolling Thrust Bearing 10 and Sliding Thrust Bearing 9 (during hard dock, this bearing will actually open a tiny clearance). Thus, Output Shaft 12 of the special payload Interface continues to turn counterclockwise until it hits a stop and, all the while, the special payload is fixed to robot SEE Driver 2 in preload. The preload status can be confirmed throughout by monitoring the motor currents of the SEE Driver. Once Output Shaft 12 of the Special Payload Interface (SPI) is stopped, that payload is properly attached to the space station structure.

Robot SEE Driver 2 continues to turn counterclockwise, even though the SPI Output Drive Shaft 12 is stopped. Thus, Bolt 4 rotates with respect to the threaded inside portion 5 of Torque Gear 6. In the process, the preload between robot SEE 2 and the special payload is quickly relieved and shortly after, the connection between robot SEE Driver 2 and the special payload goes first to hard dock, then to soft dock, and finally to ejection. The special payload has now been transferred from the robot to the space station structure.

ELECTRICAL CONNECTORS REQUIRED

I will now describe the case in which electrical connectors are required beginning with the sequence where the special payload is initially secured to the space station structure and the robot grasps it, and unfastens and removes it from the space station structure.

Figure 2:
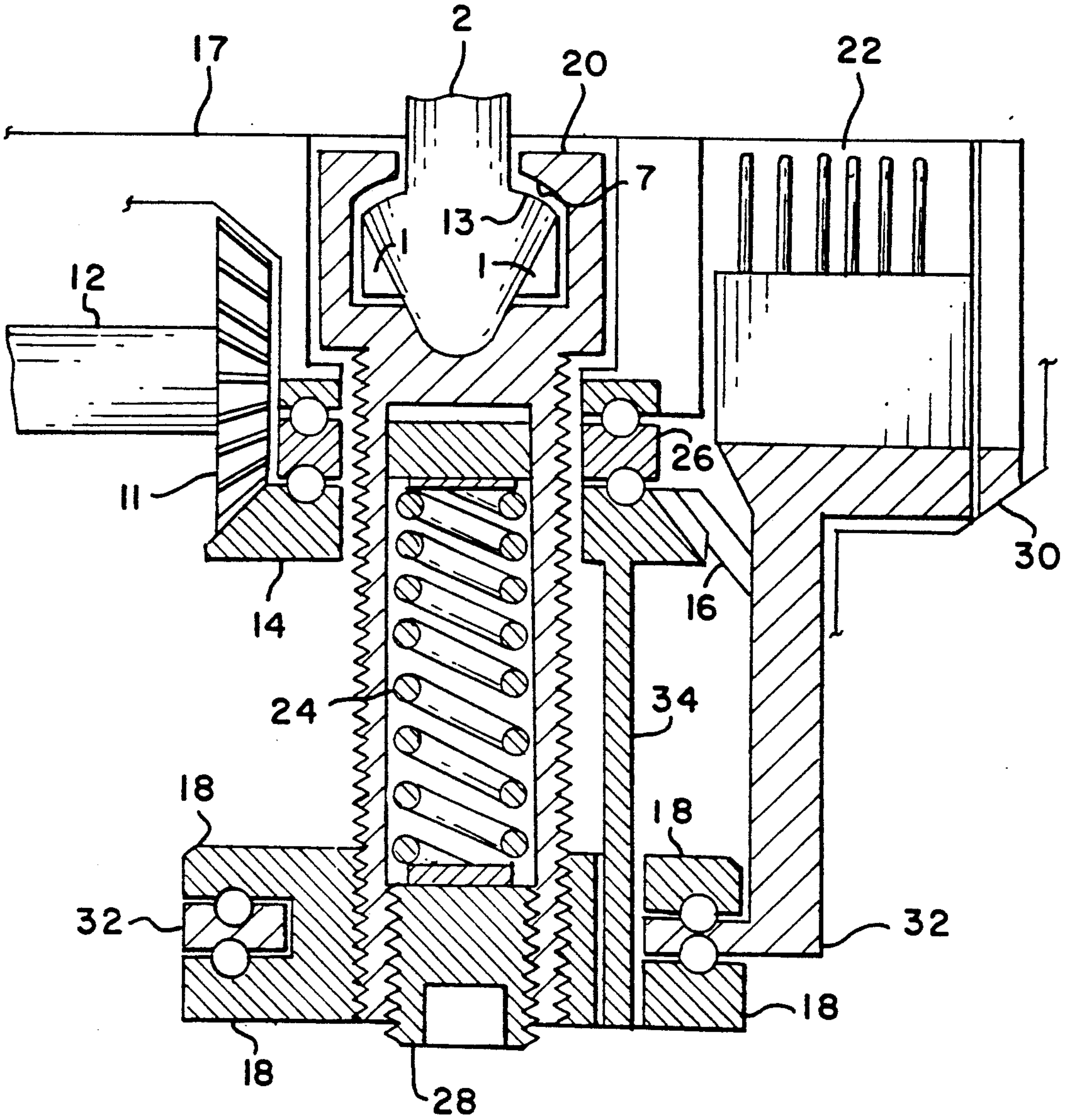
FIG. 2 is a cross-sectional view of a Spline Screw Multiple Rotations Mechanism having electrical connectors.

As shown in FIG. 2, SEE Driver 2 turns clockwise and soft docks. At this point the payload is held by both the robot and the space station structure. SEE Driver 2 continues to turn clockwise. Drive Gear 14 is held by Drive Gear Stop 16 (Drive Gear Stop 16 engages a tooth or Drive Gear 14) and is also splined to Drive Nut 18 by Coupling Spline 34. Furthermore, Bolt 20, Drive Nut 18 and Electrical Connectors 22 are all preloaded downwards by the interactions of Preload Spring 24, Preload Reaction Washer 26 and Plug 28. This preload downwards is opposed and neutralized by Electrical Connector Seat 30 on the space station structure. Thus, as Bolt 20 is turned with SEE Driver 2, there is relative rotation between Bolt 20 and Drive Nut 18 and Drive Nut 18 initially translates downwards until the system goes into Hard Dock. Shortly, however, Drive Nut 18 begins translating upwards and with it, Electrical Connector 22. This is because of the Electrical Connector/-Drive Nut Interface member 32.

This Nut translation (and with it Electrical Connectors 22) continues upwards until Drive Nut 18 encounters Drive Gear Stop 16 which frees up Drive Gear 14. By this time, Electrical Connectors 22 have activated the appropriate dust covers and are already seated in their socket counterparts. Drive Nut 18 continues upwards a few thousands of an inch until it is stopped by the lower surface of the Drive Gear 14. Frictional forces are quickly built up in the threads of Bolt 20 and Drive Nut 18 resulting in torque being generated to Drive Gear 14 through Coupling Spline 34 and, through it, to Output Gear 11 and Output Shaft 12. This rotation continues until the mechanism attached to Output Shaft 12 reaches a hard stop.

A situation now exists in which Bolt 20 is constrained from translating downwards, Drive Nut 18 is constrained from translating upwards and Output Shaft 12 is constrained from rotating even as SEE Driver 2 continues to turn clockwise. As a result, large preload forces soon build up attaching Robot SEE Driver 2 to the special payload.

I will now continue the case in which electrical connectors are required by following the sequence where the special payload is initially secured to the robot SEE and the robot fastens it to the space station structure.

The robot SEE, with special payload attached, approaches the space station structure and inserts the guide mechanisms of the special payload into the corresponding alignment guides of the space station structure using traditional force feedback and "peg-in-the-hole" techniques. SEE Driver 2 rotates counterclockwise. The frictional forces on the threads coupling Bolt 20 and Drive Nut 18 and the splines coupling Drive Gear 14 and Output Gear 11 produce an output torque such that the Output Drive Shaft 12 rotates with the Robot SEE Driver 2. Output Shaft 12 of the Special Payload Interface continues to turn counterclockwise until it hits a stop and, all the while, the Special Payload is fixed to the robot SEE in preload and Electrical Connectors 22 are engaged. The preload status can be confirmed throughout by monitoring the motor currents of the SEE Driver and/or monitoring the status of sensors inside the mechanism of the special payload through Electrical Connectors 22. Once Output Shaft 12 of the Special Payload Interface (SPI) encounters a stop, that payload is properly attached to the space station structure.

SEE Driver 2 continues to turn counterclockwise, even though the SPI Output Drive Shaft 12 is stopped. But, since Drive Nut 18 is splined to Drive Gear 14, Bolt 20 rotates with respect to the threaded inside of the Drive Nut 18, forcing Drive Nut 18 to translate downwards. In the process, the preload between the robot SEE and the special payload is quickly relieved. However, the Bolt Preload Spring 24 maintains a hard dock preload between the robot SEE and the special payload. Also, early in the downward translation process, Drive Gear Stop 16 is released by Drive Nut 18 and makes a spring contact with Drive Gear 14, preparatory to reengaging that gear if it attempts to turn.

As SEE Driver 2 continues to turn counterclockwise, Drive Nut 18 translates downwards, and with it, Electrical Connectors 22. This process continues until Electrical Connectors 22 seat on their lower contact surface. Shortly after, the Drive Nut 18 connection between the robot SEE and the special payload goes from hard dock, to soft dock, and finally to ejection. The special payload has now been transferred from the robot to the space station structure.

ALTERNATE EMBODIMENTS OF THE INVENTION

No Alternate Embodiments are presented for the Spline Screw Multiple Rotations Mechanism in which no electrical connectors are required. However, the essential functions of this type of mechanism are presented below and any arrangement which satisfies these functions would serve as an effective alternate embodiment.

1) HAND-OFF SYSTEM. The principle involved is that the robot SEE or astronaut hand tool must be able to attach in soft dock, then hard dock to the fastening point on the top of the special payload before the Output Gear 12 (FIG. 1 and 2) moves (special payload initially attached to the space station structure) and that the robot SEE or astronaut hand tool must remain attached in preload or hard dock until the special payload is completely hard docked or preloaded to the space station structure (special payload initially attached to the space station structure). This is accomplished by ensuring that the frictional torque provided by the Sliding Thrust Bearing 9 (FIG. 1), is always greater than the frictional torque between the inside threaded portion of the Torque Gear 6 (FIG. 1) and the Bolt 4 threads when the system is in ejection, soft dock or hard dock modes. That is, when the preload spring 8 is exerting a net downward force (over the SEE reactive force), the Torque Gear 6 prefers to remain stationary and the Bolt 4 prefers to rotate and translate. This is accomplished by a traction hold with a lever arm for the Torque Gear 6 larger than that for the Bolt 4 threads. But any means of accomplishing this bias will suffice.

2) TIMED TORQUE TRANSMISSION SYSTEM. The principle involved is that clockwise torque is transmitted to the Output Shaft 12, FIG. 1, immediately after the robot SEE and the Bolt of the special payload go into hard dock (special payload initially attached to the space station structure) and counterclockwise torque is transmitted to the Output Shaft 12 only while the robot SEE and the Bolt of the special payload remain in preload or hard dock (special payload initially attached to the robot SEE). There are several ways to accomplish this. The preferred method is presented as the simplest, most reliable and most compact. No alternate embodiment is presented.

Figure 3:
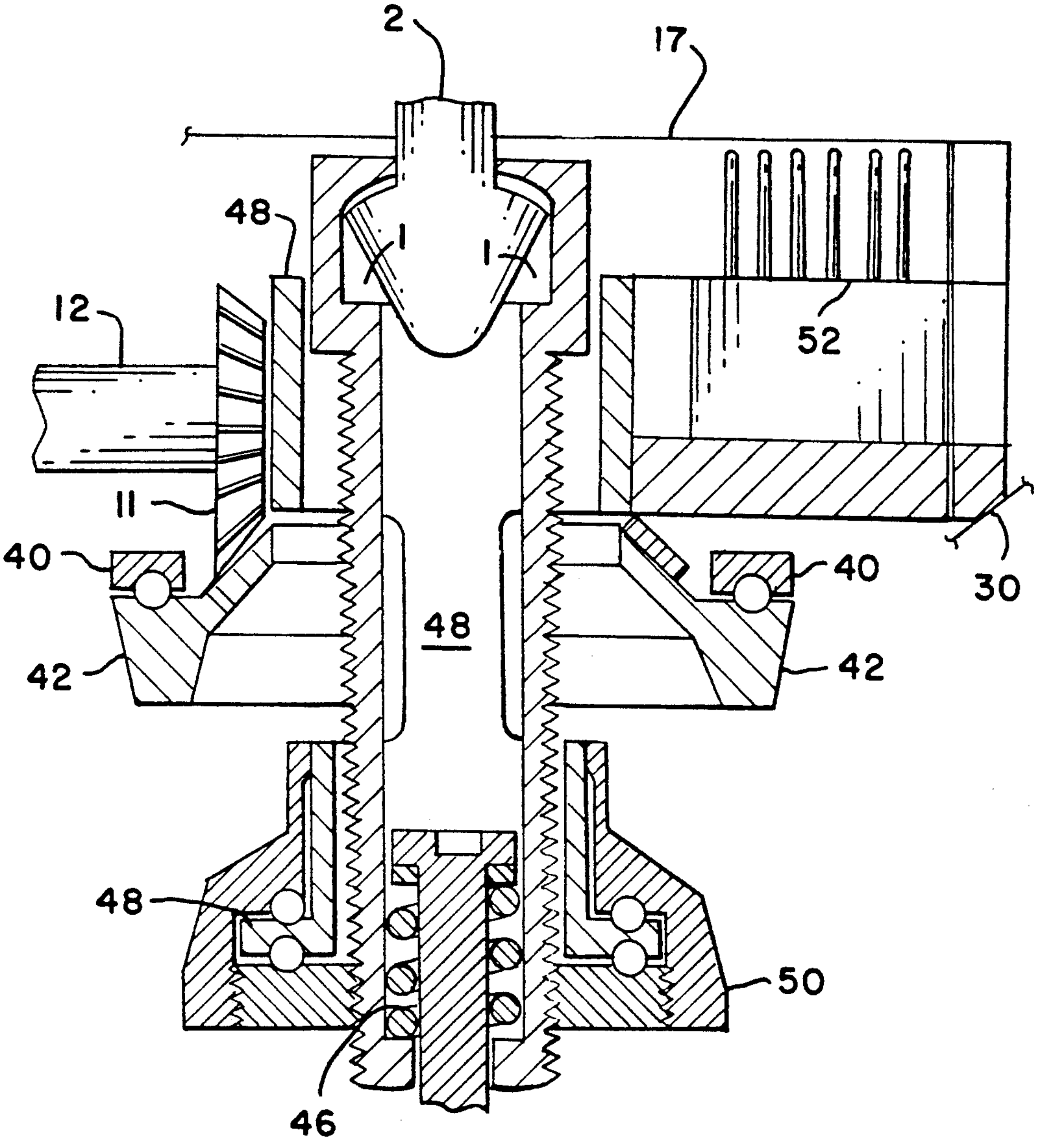
FIG. 3 is a cross-sectional view of an alternate embodiment of a Spline Screw Multiple Rotations Mechanism having electrical connectors.

An alternate embodiment for the Spline Screw Multiple Rotations Mechanism which mate Electrical Connectors is presented in FIG. 3. The functional essentials of this type of mechanism involve:

a) Hand-Off System. The principle involved is that the robot SEE or astronaut hand tool must be able to attach in soft dock, then hard dock to the fastening point on the top of the special payload and the Electrical Connections must be complete before the Output Shaft 12 moves (special payload initially attached to the space station structure) and that the robot SEE or astronaut hand tool must remain attached in preload or hard dock with Electrical Connections complete until the special payload is completely hard docked or preloaded to the space station structure (special payload initially attached to the robot or astronaut hand tool). This is accomplished by ensuring that the frictional torque provided by the Torque Gear Sliding Thrust Bearing 42, is always greater than the frictional torque between the inside threaded portion of the Torque Gear 42 and the Bolt 44 threads when the system is in Ejection, soft dock or hard dock modes. That is, when the preload spring 46 is exerting a net downward force (over the SEE reactive force and the friction of Electrical Connections), the Torque Gear 42 prefers to remain stationary and the Bolt 44 prefers to rotate and translate. This is accomplished by a traction hold with a lever arm for the Torque Gear 42 larger than that for the Bolt 44 threads. But any means of accomplishing this bias will suffice.

b) Timed Torque Transmission System. The principle involved is that clockwise torque is transmitted to the Output Shaft 12 immediately after the robot SEE and the Bolt of the special payload go into hard dock (special payload initially attached to the space station structure) and counter-clockwise torque is transmitted to the Output Shaft 12 only while the robot SEE and the Bolt of the special payload remain in preload or hard dock with Electrical Connections complete (special payload initially attached to the robot SEE). There are several ways to accomplish this. The preferred method is presented as the simplest, most reliable and most compact.

I will now describe a specific alternate embodiment for the case in which electrical connectors are required beginning with the sequence where the special payload is initially secured to the space station structure and the robot grasps it, and unfastens and removes it from the space station structure.

SEE Driver 2 turns clockwise and soft docks. At this point the Payload is held by both the robot and the space station structure.

SEE Driver 2 continues to turn clockwise. The Connector/Nut Interface 48 is splined to the space station structure and so cannot rotate. The Drive Nut 50 is coupled to Bolt 44 by friction via screw threads and the Connector/Nut Interface via preload spring friction. Thus, there is relative rotation between Bolt 44 and Drive Nut 50, and Drive Nut 50 translates upwards.

Drive Nut 50 translation (and with it the Electrical Connectors) continues upwards until the Traction Drive Surface of Drive Nut 50 encounters the corresponding Traction Drive Surface of Torque Drive Gear 42. Enroute, Electrical Connectors 52 activate the appropriate dust covers and seat in the robot SEE.

SEE Driver 2 continues to turn clockwise. Bolt 44 is prevented from translating downwards by the robot SEE Driver 2 and Drive Nut 50 is prevented from translating upwards by Torque Drive Gear 42. Thus frictional forces build up rapidly on the threads coupling Bolt 44 and Drive Nut 50 and the Traction Drive Surface Interface coupling Torque Drive Gear 42 and Drive Nut 50. These forces soon exceed the nominal and constant frictional forces coupling Drive Nut 50 to Connection Nut Interface 48 which oppose the rotation of Drive Nut 50.

Thus the Drive Nut 50, and with it, the Torque Drive Gear 42, soon begin to rotate with the SEE Driver 2, providing an output torque through Output Gear 11 to Output Shaft 12. This rotation continues until the mechanism attached to Output Gear 12 reaches a hard stop.

A situation now exists in which Bolt 44 is constrained from translating downwards, Drive Nut 50 is constrained from translating upwards and the Output Gear 11 is constrained from rotating even as the SEE Driver 2 continues to turn clockwise. As a result, large preload forces soon build up attaching the robot SEE to the special payload.

I will now continue the case in which electrical connectors are required by following the sequence where the special payload is initially secured to the robot SEE and the robot fastens it to the space station structure.

The robot SEE, with special payload attached, approaches the space station Structure and inserts the guide mechanisms of the special payload into the corresponding alignment guides of the space station structure using traditional force feedback and "peg-in-the-hole" techniques. SEE Driver 2 rotates counter-clockwise. The frictional forces on the threads coupling Bolt 44 and Drive Nut 50 and the Traction Drive Surface Interface coupling Torque Drive Gear 42 and Drive Nut 50 exceed the nominal and constant frictional forces coupling Drive Nut 50 to Connection Nut Interface 48 which oppose the rotation of Drive Nut 50 so the Output Drive Shaft 12 rotates with the robot SEE Driver 2. Thus, the Output Shaft 12 of the special payload Interface continues to turn conter-clockwise until it hits a stop and, all the while, the special payload is fixed to the robot SEE in preload and the Electrical Connectors 52 are engaged. The preload status can be confirmed throughout by monitoring the motor currents of the SEE Driver 2 and/or monitoring the status of sensors inside the mechanism of the special payload through the Electrical Connectors 52. Once the Output Shaft 12 of the special payload Interface (SPI) encounters a stop, that payload is properly attached to the space station Structure.

SEE Driver 2 continues to turn counter-clockwise, even though the SPI Output Drive Shaft 12 is stopped. Thus, Bolt 44 rotates with respect to the threaded inside portion of Drive Nut 50, forcing Drive Nut 50 to break its Traction Drive couple with Torque Drive Gear 42 and translate downwards. In the process, the preload between the robot SEE and the special payload is quickly relieved. However, the Bolt preload Spring 46 maintains a hard dock preload between the robot SEE and the special payload.

As SEE Driver 2 continues to turn counter-clockwise, Drive Nut 50 translates downwards, and with it, Electrical Connectors 52. This process continues until Electrical Connectors 52 seat on their lower contact surface. Shortly after, the Drive Nut connection between the robot SEE and the special payload goes from hard dock, to soft dock, and finally to Ejection. The special payload has now been transferred from the robot to the space station Structure.

PERFORMANCE

GRASPING FORCE:

The Spline Screw Multiple Rotations Mechanism is configured similarly to the WAM/WAF and End Effector Change Mechanism (EECM) and the Spline Screw Payload Fastening System (SSPFS). However, its Bolt diameter is 50% larger than that of the WAM/WAF, slightly reducing its grasping (preload) force. Thus the grasping force will be approximately 670 lbf using 8 ft-lbf driving torque. And, as in the examples of the WAM/WAF, EECM and SSPFS, the system will not inadvertently back drive.

HOLDING TORQUES.

The ability of the SSMRM to structurally react axial rotational torque is practically unlimited because of the structural strength of the clocking and alignment tabs of the SEE. The ability of the SSPFS to structurally react torque attempting to separate the SEE and the ORU in tilt is similar to the SSPFS and is described below. 670 lbf/6=111 ft-lbs with preload and thus remain rattle free. The system would be able to withstand up to 1,560 ft-lbf torque without yield. Thus, the holding torque of the system even in preload would be more than that which a space robot could supply.

$$F_{yi}R_{see}=T_{yi}=\sigma A_s R_{see}=1{,}560\ \mathit{ft\text{-}lbf}$$

Where:

$F_{yi}$=Force to SEE Driver can withstand before yield $R_{see}$=Radius of the structure of the SEE=2 in.

$T_{yi}$=Torque (in tilt direction) the system can withstand before yield $\sigma$=Yield strength of SEE material in PSI=85 E 3 lbf/in$^2$ $=\pi(\frac{3}{8})^2/4$

HOLDING FORCES:

The maximum holding force with preload in the Z or axial direction is 1,000 lbf. The maximum holding force to yield is 9,380 lbf. Shear forces are practically unlimited because these forces are opposed by the clocking tabs.

PRELOAD SPRING DESIGN:

As is shown in FIGS. 1 and 2, the preload spring is long (on the order of 1.25 in.) and so it can compress amounts on the order of ⅛ in. without significantly changing the spring force (nominally 100 lbf.).

I will now estimate the torque losses caused by this 100 lbf preload. Because the radius of the spring is small to start with (½ in.), these torque losses will not be excessive. Placing thin teflon washers between the spring and the threaded bolt and between the spring and the Bolt (and Plug) structure further reduces the coefficient of friction to a minimum and with it, significantly reduces the torque losses.

$$F_{ps}\mu_{s1}R_b=T_{pbs}=0.21\ \mathit{ft\text{-}lbf}$$

Where:

$F_{ps}$=Preload spring force=100 lbf.

$\mu_{s1}$=Static coefficient of friction for bolt=0.05 for teflon $R_b$=Bolt radius=0.5 in The preload spring, however, also acts on the captive threads of the bolt when the bolt is preloaded in its storage condition. In this instance we have:

$$F_{ps}\mu_{s2}R_{ct}=T_{pct}=0.492\ \mathit{ft\text{-}lbf}$$

Where:

$\mu_{s2}$=Static coefficient of friction for captive threads =0.15 for silver $R_{ct}$=Captive thread radius=5/16 in.

And, thus the total torque losses will be less than 1 ft-lbf which is acceptable.

ELECTRICAL CONNECTIONS:

As is the case with the WAM/WAF and the EECM, power and signal interfaces are handled with exceptional efficiency. That is, the alignment in hard dock between the mating pairs is very precise as is the travel of the electrical connector. Thus, electrical (and fiber optic) connectors mate with great precision. This means that long lead in guides are not required and the system can be made very compact. Also, because of the large forces generated by the system (easily 100 lbf in its weakest mode of removal using the Bolt preload spring), pin insertion and removal forces are not a factor. Even with the compact configuration presented, approximately 40 power/signal channels will be available.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A system for coupling two bodies together and for transmitting torque from one body to another comprising:

a first body having a splined driver for providing input torque;

a second body having a threaded drive member capable of rotation and of limited translation embedded therein that will mate with and fasten to said splined driver; rotation and of limited translation embedded therein, said bevel gear member coaxial with and attached to said threaded drive member;

means for providing a compressive force on said rotating threaded member;

means for limiting the translation of said bevel gear member such that when said bevel gear member reaches the upward limit of its translation said two bodies are fully coupled and said bevel gear member then rotates due to the input torque transmitted from said splined driver to said threaded drive member to said bevel gear member;

an output bevel gear having an attached output drive shaft embedded in said second body, said output bevel gear meshing with said threaded rotating bevel gear member thereby transmitting said input torque to said output drive shaft.

2. The system of claim 1 wherein said means for limiting the translation of said bevel gear member comprises a thrust bearing on the upward surface of said bevel gear member.

3. The system of claim 2 wherein said means for providing a compressive force on said rotating threaded member comprises a compression spring in conjunction with a threaded member allowing adjustment of said compression spring.

4. The system of claim 3 wherein said bevel gear member is attached to said threaded drive member by internal threads on said bevel gear member.

5. The system of claim 3 wherein said bevel gear member is attached to said threaded drive member by a splined member between said bevel gear member and a drive nut that is threadably attached to said threaded drive member.

6. The system of claim 5 further including a plurality of connectors attached to said drive nut.

* * * * *